(12) United States Patent
Miyaji et al.

(10) Patent No.: US 8,643,237 B2
(45) Date of Patent: Feb. 4, 2014

(54) MOTOR SUPPORT STRUCTURE AND ACTUATOR INCORPORATING SAME

(75) Inventors: Haruka Miyaji, Nagano (JP); Tomoyuki Suzuki, Nagano (JP); Masaki Kagawa, Nagano (JP); Takayuki Matsui, Shizuoka (JP)

(73) Assignee: Minebea Co., Ltd., Nagano (JP)

( * ) Notice: Subject to any disclaimer, the term of this patent is extended or adjusted under 35 U.S.C. 154(b) by 45 days.

(21) Appl. No.: 13/164,923

(22) Filed: Jun. 21, 2011

(65) Prior Publication Data
US 2011/0316374 A1  Dec. 29, 2011

(30) Foreign Application Priority Data
Jun. 23, 2010 (JP) .................................. 2010-142456

(51) Int. Cl.
*H02K 7/10* (2006.01)
*H02K 5/00* (2006.01)

(52) U.S. Cl.
USPC ..................... 310/83; 310/40 MM; 310/75 R; 310/80

(58) Field of Classification Search
USPC ................ 310/40 MM, 156.32, 75 R, 80, 83
See application file for complete search history.

(56) References Cited

U.S. PATENT DOCUMENTS

| | | | |
|---|---|---|---|
| 6,811,170 B2 * | 11/2004 | Mosler | 280/124.176 |
| 2002/0130567 A1 * | 9/2002 | Kujira | 310/68 B |
| 2007/0035190 A1 * | 2/2007 | Ueno | 310/90 |
| 2010/0001594 A1 * | 1/2010 | Shimoyama | 310/51 |

FOREIGN PATENT DOCUMENTS

| | | | |
|---|---|---|---|
| DE | 102004048700 A1 * | 5/2006 | |
| JP | 3050791 B2 | 6/2000 | |
| JP | 2006067694 A * | 3/2006 | |
| JP | 4098454 B2 | 6/2008 | |

OTHER PUBLICATIONS

Machine Translation DE102004048700 (2006) and JP2006067694 (2006).*

* cited by examiner

*Primary Examiner* — Tran Nguyen
*Assistant Examiner* — Jose Gonzalez Quinones
(74) *Attorney, Agent, or Firm* — Carrier Blackman & Associates, P.C.; Joseph P. Carrier; William D. Blackman

(57) ABSTRACT

There is provided an actuator including a motor and a case adapted to house the motor. In the actuator, an output shaft of the motor is supported by a structured configured such that an elastic member is disposed between the case and at least one end of the output shaft, wherein the elastic member is in contact with a portion of the case in an engaging manner whereby the elastic member is prevented from shifting relative to the case in the rotation direction of the output shaft, and also wherein the elastic member is in contact with a portion of the motor in an engaging manner whereby a body of the motor is prevented from shifting relative to the elastic member in the rotation direction of the output shaft.

7 Claims, 5 Drawing Sheets

MOTOR SUPPORT STRUCTURE AND ACTUATOR INCORPORATING SAME

BACKGROUND OF THE INVENTION

1. Field of the Invention

The present invention relates to a motor support structure of an actuator using a motor.

2. Description of the Related Art

A conventional structure for supporting a motor output shaft in an actuator is described in, for example, Japanese Patent No. 3050791, which is configured such that a primary gear is put on an output shaft of a motor, and secondary and other gears are engaged in series with the primary gear so that a driving force of the motor is transmitted via the primary gear to the secondary and other gears in sequence and thereby the secondary and other gears are caused to rotate, wherein bearings for the output shaft of the motor are supported by using elastic members, such as O-shaped rings, which are arranged near a body of the motor, in order to reduce vibration and noise.

In the structure described above, at a side of the output shaft having the primary gear, the O-shaped ring (elastic member) is located axially between the primary gear and the body of the motor.

Also, Japanese Patent No. 4098454 discloses a motor actuator in which a motor is supported in such a manner that the axially front and rear ends of a motor body are pressed by respective pressing ribs formed at front and motor support portions of a case, whereby the motor is fixed at a small area so as to make it difficult for the vibration and noise generated by the motor to be transmitted to the case.

A motor can be fixed to a case by means of an O-shaped ring generally available, but since the ring has a circular configuration, some countermeasures must be taken to prevent a motor body shifting in the direction of motor output shaft rotation relative to the case. As one method of the countermeasures, a part of an outer frame of the motor may be set in touch with the case for preventing rotation of the motor body relative to the case, but this method allows the vibration of the motor to be easily transmitted to the case. This problem may be solved by using a vibration-proofing material but the number of component members is increased.

Also, a structure for supporting the end of an output shaft of a motor may be integrated with a case. However, while the property required for a case material is different from the property required for a bearing material, priority is put on the strength of the case therefore resulting in failure to contribute to the reduction of vibration and noise.

SUMMARY OF THE INVENTION

The present invention has been made in light of the problems described above, and it is an object of the present invention to provide a motor support structure which enables reduction of vibration and noise generated when a motor is driven, and also to provide an actuator which incorporates such a motor support structure.

In order to achieve the object described above, according to a first aspect of the present invention, there is provided an actuator including a motor which is housed in a case of the actuator. In the actuator, an output shaft of the motor is supported by a structure configured such that an elastic member is disposed between the case and at least one end of the output shaft, wherein the elastic member is in contact with the case in such a manner such that the elastic member engages with a portion of the case whereby the elastic member is prevented from shifting relative to the case in the rotation direction of the output shaft, and wherein the elastic member is in contact with the motor in such a manner that the elastic member engages with a portion of the motor whereby a body of the motor is prevented from shifting relative to the elastic member in the rotation direction of the output shaft.

According to a second aspect of the present invention, there is provided an actuator which includes a motor and a case adapted to house the motor and in which a first gear is provided on an output shaft of the motor, and other gears are connected in series to the first gear, whereby the driving force of the motor is transmitted to the other gears so as to rotate the other gears. In the actuator, the output shaft of the motor is supported by a structure which is configured such that a first bearing located at one end of the output shaft having the first gear is disposed at a frame arranged at an axial end of a body of the motor and is supported in such a manner that a first elastic member is disposed between the case and the one end of the output shaft, wherein the case includes a first engagement recess adapted to engage with the first elastic member, and which is further configured such that a second bearing located at the other end of the output shaft not having the first gear is supported in such a manner that a second elastic member is disposed between the case and the other end of the output shaft, wherein the case includes a second engagement recess, the second elastic member is shaped corresponding to the second engagement recess to thereby engage with the second engagement recess and includes a bearing receiving hole and at least one rotation preventing boss disposed in contact with the motor, and wherein the motor includes a rotation preventing means which is constituted by either at least one hole or at least one recess and which is adapted to engage with the at least one rotation preventing boss of the second elastic member.

In the second aspect of the present invention, the second elastic member may have an oval shape adapted to engage with the second engagement recess of the case.

Also, in the second aspect of the present invention, external connection terminals of the actuator may be connected to the lead wire terminals of the motor via an FPC.

According to the present invention, a motor support structure can be provided which enables reduction of vibration and noise generated when a motor is driven, and also an actuator can be provided which incorporates such a motor support structure.

Specifically, in the motor support structure according to the present invention, the rotation of a motor body can be prevented by using elastic members, and at the same time the vibration and noise of the motor can be reduced by using an FPC for electrical connection.

DETAILED DESCRIPTION OF THE INVENTION

An exemplary embodiment of the present invention will hereinafter be described with reference to the accompanying drawings.

Figure 1A:
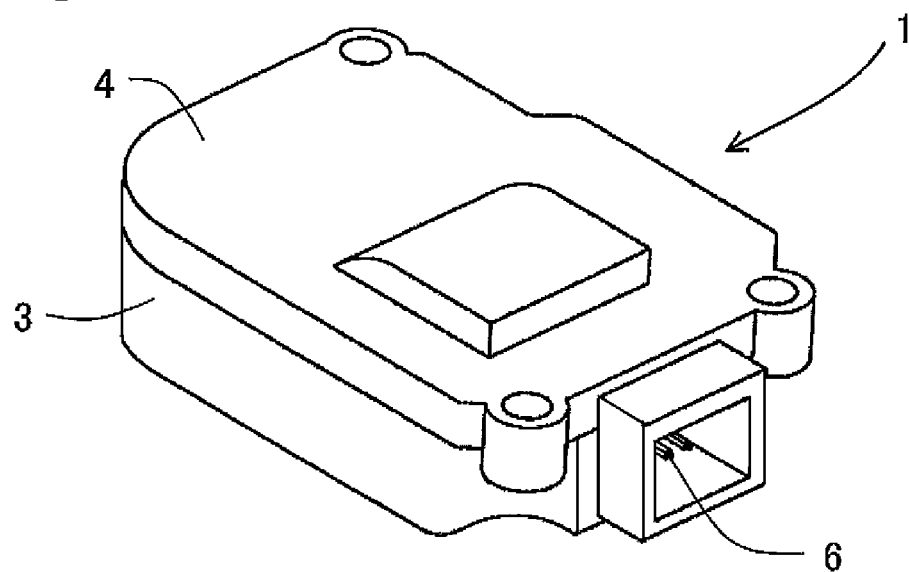
FIG. 1A is a perspective view of an actuator according to an embodiment of the present invention, seen from a top side.
Figure 1B:
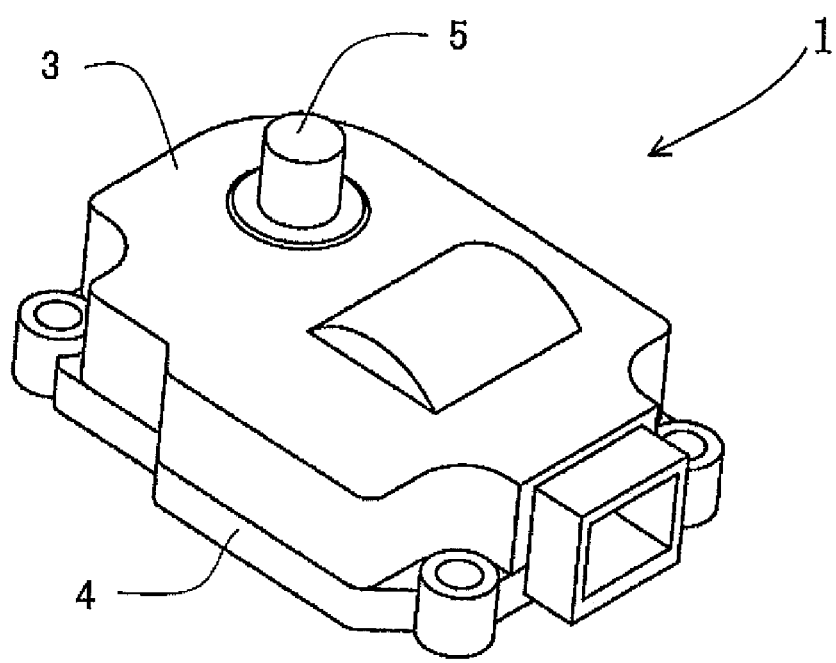
FIG. 1B is a perspective view of the actuator of FIG. 1A, seen from a bottom side.

FIGS. 1A and 1B perspectively illustrate external appearances of an actuator 1 according to an embodiment of the present invention, wherein FIG. 1A shows a top side aspect and FIG. 1B shows a bottom side aspect.

Referring to FIGS. 1A and 1B, the actuator 1 according to the embodiment externally includes a case 3 and a cover 4, which act in combination as a housing, wherein a plurality of external connection terminals 6 and an output gear shaft 5 are exposed respectively at the circumferential side and the bottom side of the housing composed of the case 3 and the cover 4.

Figure 2:
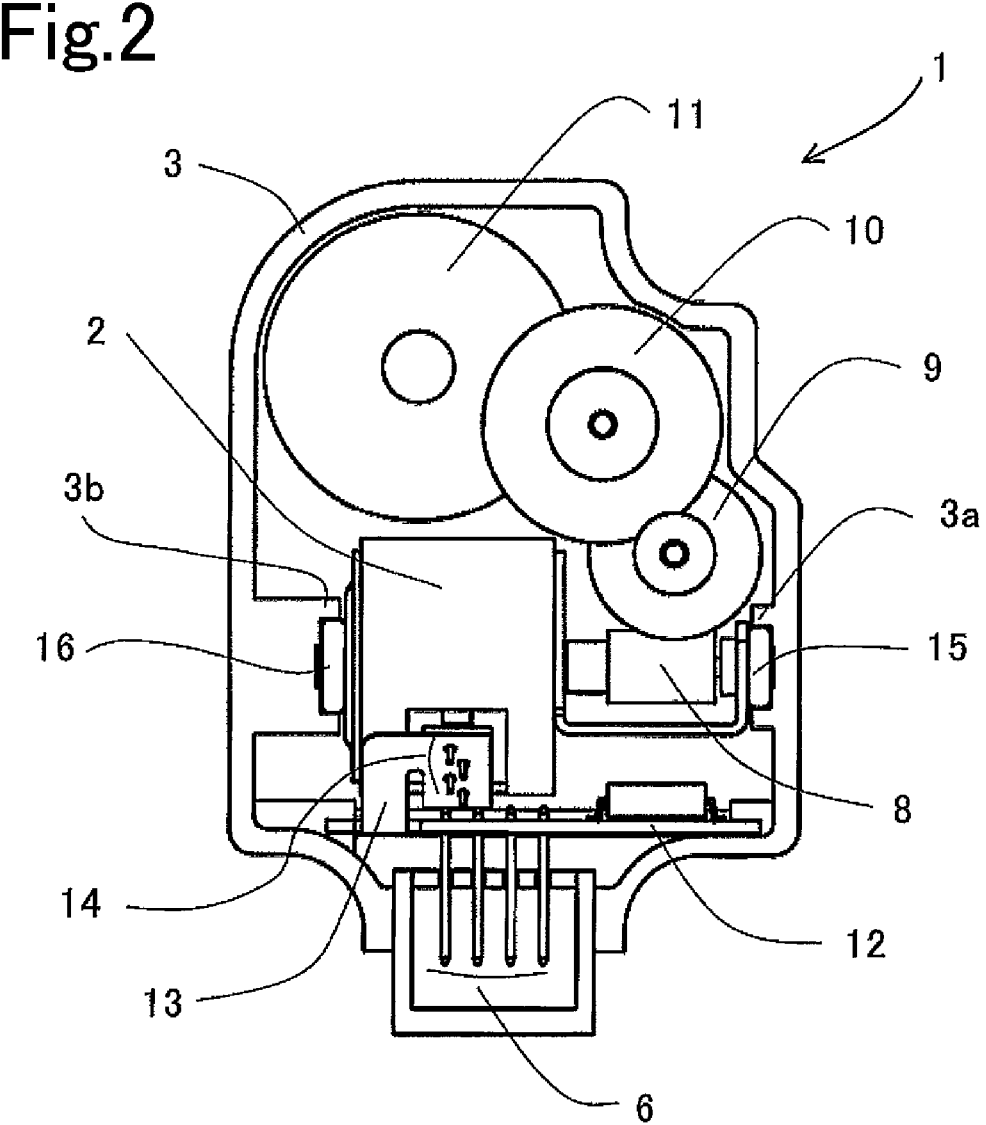
FIG. 2 is a schematic plan view of a component structure of the actuator of FIG. 1A/1B (with a cover removed)

FIG. 2 illustrates internal component parts of the actuator 1.

In FIG. 2, the cover 4 is removed from the actuator 1 shown in FIG. 1A/1B in order to show an internal structure of the actuator 1.

Referring to FIG. 2, the actuator 1 internally includes a stepping motor 2 to generate a driving force, a PCB (printed circuit board) 12 on which a driving circuit to drive the stepping motor 2 is mounted, and an FPC (flexible printed circuit board) 13 to be connected to lead wire terminals 14 of the stepping motor 2.

While the stepping motor 2 is employed as a driving source of the actuator 1 in the embodiment, the present invention is not limited to such an arrangement and any appropriate kinds of motors may be used.

A driving signal for driving the stepping motor 2, which is fed via the external connection terminals 6 mentioned earlier, is input to the lead wire terminals 14 of the stepping motor 2 via the PCB 12 and the FPC 13 which are connected with the external connection terminals 6.

The actuator 1 has a gear train system which includes a first gear 8 press-fitted on an output shaft (rotor shaft) 7 (see FIG. 6 to be referred to later) of the stepping motor 2, and which further includes a second gear 9 rotatably supported on a second gear pin-like shaft 3c fixedly attached to the case 3, a third gear 10 rotatably supported on a third gear pin-like shaft 3d fixedly attached to the case 3, an output gear 11, and the earlier mentioned output gear shaft 5 formed integrally with the output gear 5.

When a driving signal is input via the external connection terminals 6, the output shaft 7 of the stepping motor 2 is rotated, and the first gear 8 is rotated together with the output shaft 7. The rotation of the first gear 8 is transmitted, in sequence, to the second gear 9, the third gear 10, and the output gear 11, and is then delivered outside by way of the output gear shaft 5 which is linked to the output gear 11.

A first engagement recess 3a, with which a first elastic member 15 (to be described later) is engaged, is arranged at the inner face of a circumferential wall of the case 3 so as to face one end (at which the first gear 8 is disposed) of the stepping motor 2, and a second engagement recess 3b, with which a second elastic member 16 (to be described later) is engaged, is arranged at the inner face of the circumferential wall of the case 3 so as to face the other end (opposite to the one end) of the stepping motor 2.

Figure 3:
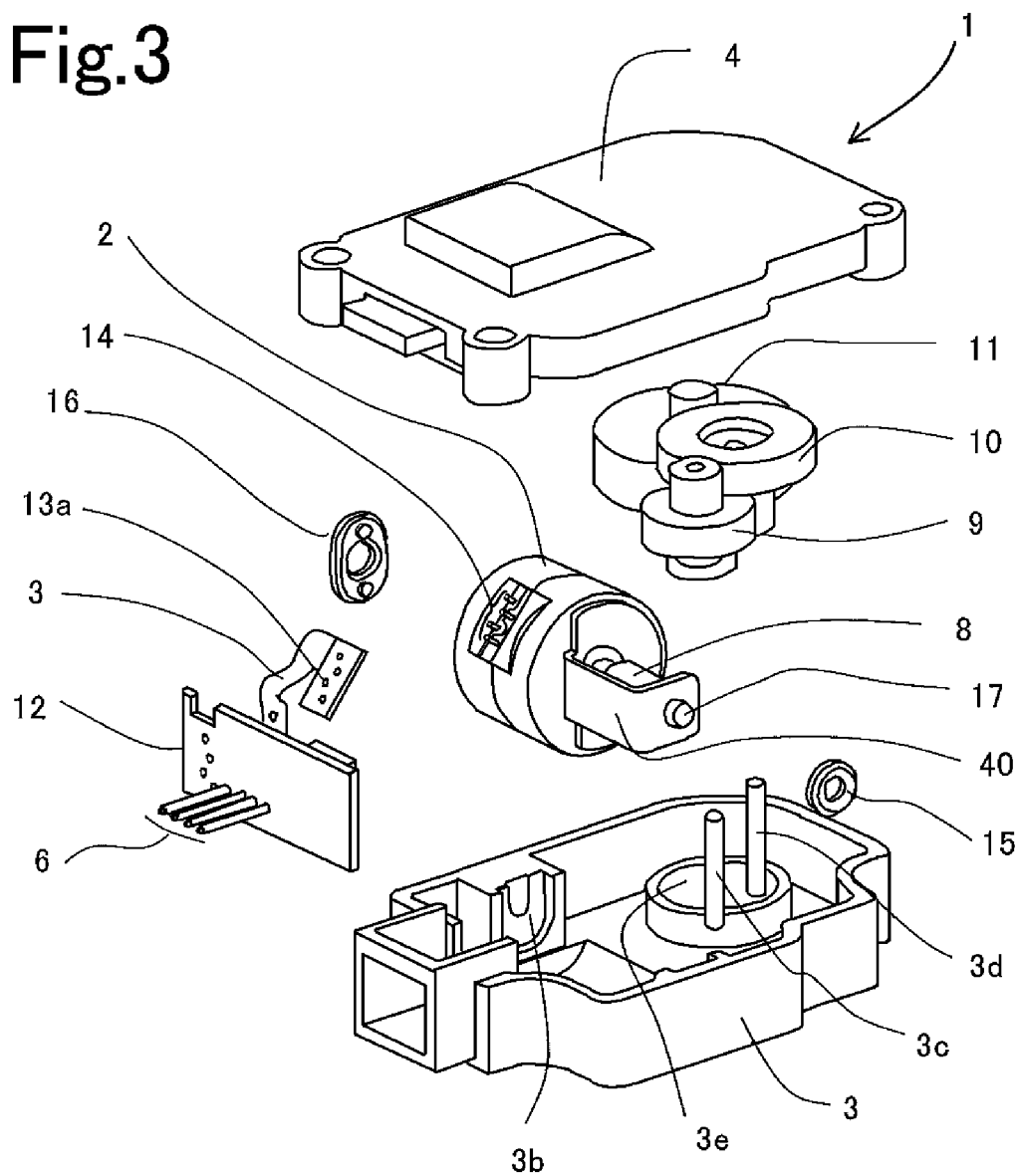
FIG. 3 is an exploded perspective view of the actuator of FIG. 1A/1B.

FIG. 3 perspectively shows the actuator 1 of FIG. 1A/1B in an exploded manner.

Figure 4:
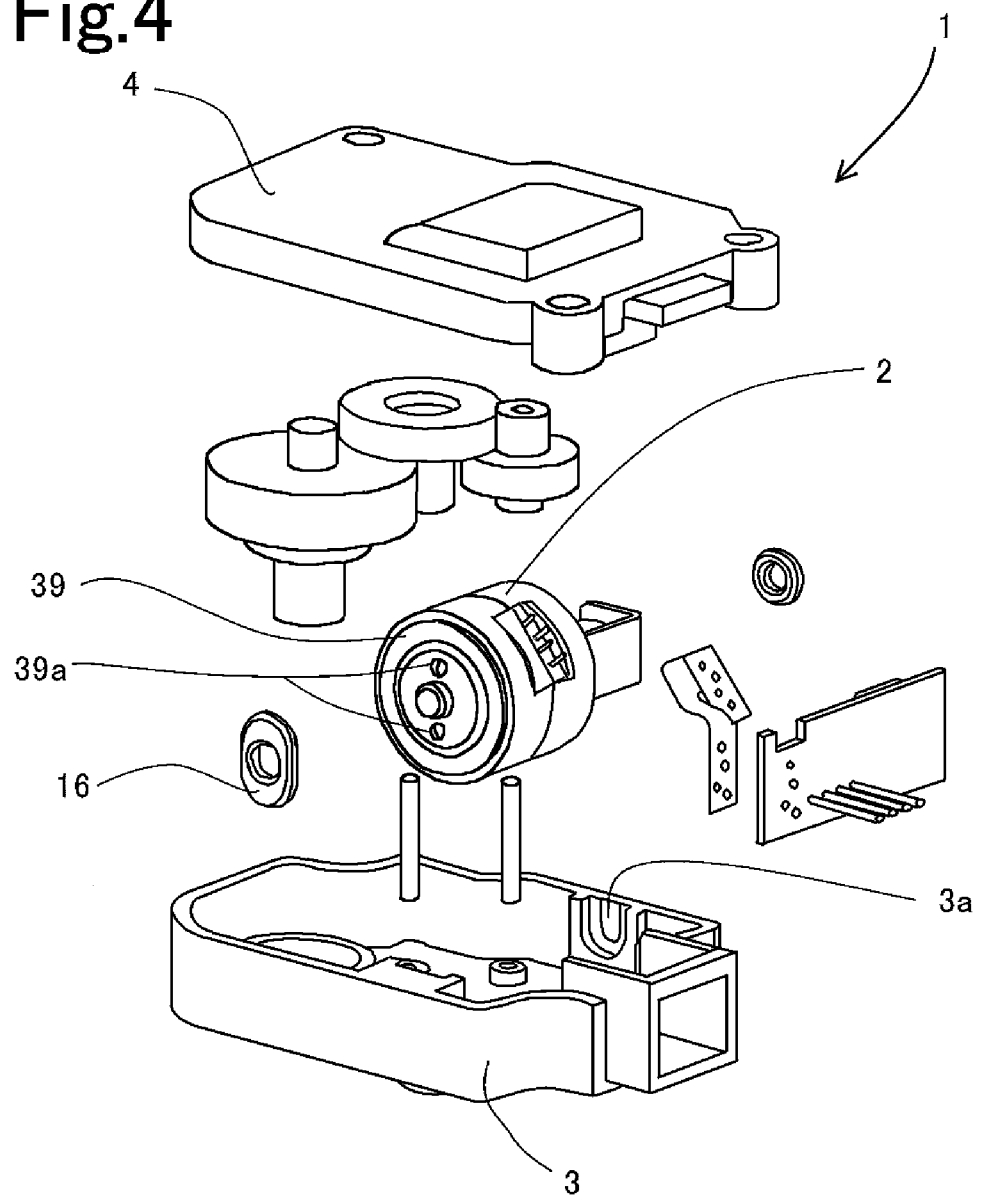
FIG. 4 is an exploded perspective view of the actuator of FIG. 1A/1B, seen from a different direction from FIG. 3.

FIG. 4 perspectively shows the actuator 1 of FIG. 1A/1B in an exploded manner, seen from a different direction from FIG. 3.

Figure 5:
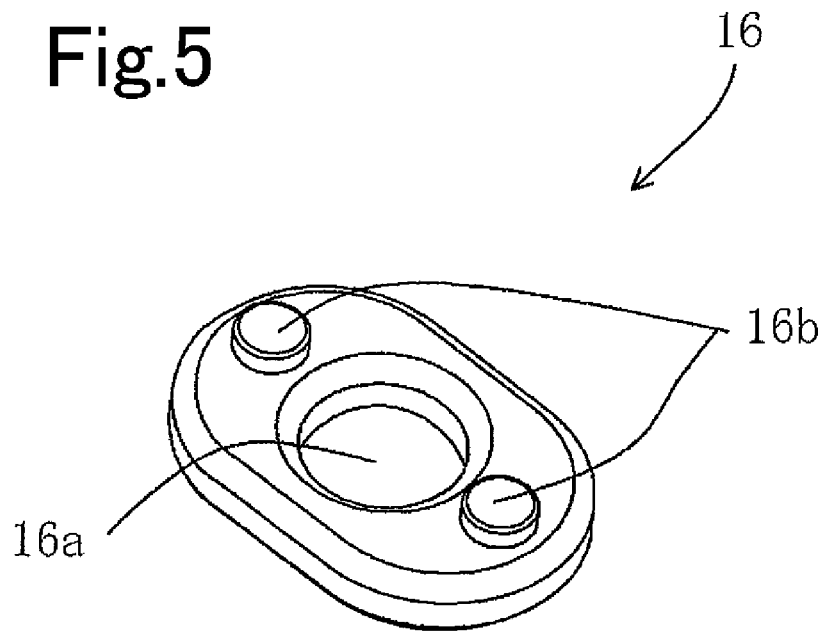
FIG. 5 is an enlarged perspective view of a second elastic member employed in the actuator of FIG. 1A/1B.

FIG. 5 perspectively shows the above described second elastic member 16 in an enlarged manner.

Figure 6:
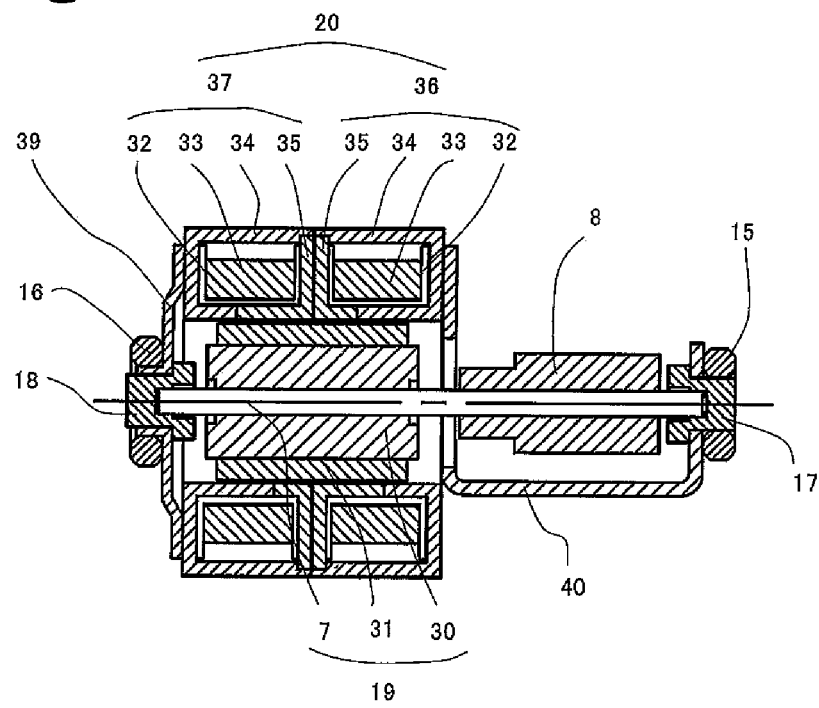
FIG. 6 is an axial cross sectional view of a stepping motor used in the actuator of FIG. 1A/1B.

FIG. 6 shows a cross section of the stepping motor 2 and other relevant component parts.

Description will be made on a motor support structure according to the present invention with reference to FIGS. 3 to 6.

Referring to FIG. 6, the stepping motor 2 includes a rotor 19 which is constituted such that a sleeve 30 is disposed around the earlier mentioned output shaft 7 and a permanent magnet 31 is disposed around the sleeve 30.

The stepping motor 2 further includes a stator assembly 20 of claw pole type, which is basically constituted such that an A-phase stator unit 36 and a B-phase stator unit 37 are disposed to be axially aligned with each other. Each of the A-phase stator unit 36 and the B-phase stator unit 37 includes a pair of yokes, specifically an outer yoke 34 and an inner yoke 35, which each have pole teeth opposing the outer circumferential surface of the permanent magnet 31 so as to form an air gap therebetween.

Each of the A-phase stator unit 36 and the B-phase stator unit 37 further includes a bobbin 32, and a coil 33 wound around the bobbin 32. The coil 33 is housed in the outer and inner yokes 34 and 35 and connected to the lead wire terminals 14.

The stepping motor 2 is arranged inside the actuator 1 as described below. The output shaft 7 is rotatably held such that one end of the output shaft 7 having the first gear 8 is supported by a first bearing 17 arranged at the distal end portion of a frame 40 fixedly attached to the outer yoke 34 of the A-phase stator unit 36 and such that the other end of the output shaft 7 is supported by a second bearing 18 arranged at a rear plate 39 fixedly attached to the outer yoke 34 of the B-phase stator unit 37.

The first bearing 17 is engagingly fitted in the earlier mentioned first elastic member (O-shaped ring in the embodiment) 15 which is engaged with the first engagement recess 3a (see FIG. 4) of the case 3. The first elastic member 15 is made of a material, for example rubber, which works to absorb vibration and noise.

The second bearing 18 is engagingly fitted in the earlier mentioned second elastic member 16 which is engaged with the second engagement recess 3b (see FIG. 3) of the case 3. The second elastic member 16, like the first elastic member 15, is made of a material, for example rubber, which works to absorb vibration and noise.

As described above, the stepping motor 2 is held inside the case 3 of the actuator 1 by a support structure which is configured such that the first and second elastic members 15 and 16 are engaged respectively with the first and second engagement recesses 3a and 3b arranged at the case 3. Since the first and second elastic members 15 and 16 are provided between the case 3 and the first and second bearings 17 and 18 of the stepping motor 2, the vibration and noise of the stepping motor 2 are not transmitted directly to the case 3.

Also, in the support structure described above, the vibration and noise of the stepping motor 2 are absorbed by the first and second elastic members 15 and 16, which results in reducing the vibration and noise of the stepping motor 2.

Further, in the embodiment, the body of the stepping motor 2 can be prevented from shifting relative to the case 3 in the direction of motor rotation while a part of the stepping motor 2 is kept free from direct contact with the case 3. That is to say, the body of the stepping motor 2 is prevented from shifting relative to the case 3 in the direction of motor rotation by means of the first and second elastic members 15 and 16 which are provided between the stepping motor 2 and the case 3.

Specifically, in the embodiment, the first elastic member 15 and the second elastic member 16 are engaged respectively with the first engagement recess 3a and the second engagement recess 3b of the case 3 as shown in FIG. 2, whereby the body of the stepping motor 2 can be securely prevented from shifting relative to the case 3 in the direction of motor rotation.

Also, in the embodiment, the second elastic member 16 has an oval shape as shown in FIG. 5. The second engagement recess 3b is configured corresponding to the oval shape of the second elastic member 16, and therefore the body of the stepping motor 2 is further securely prevented from shifting relative to the case 3 in the direction of motor rotation. The second elastic member 16 does not have to have an oval shape but may have any alternative shape, for example D-shape, that serves to prevent the second elastic member 16 from shifting relative to the case 3 in the direction of motor rotation.

Furthermore, in the embodiment, as shown in FIG. 5, the second elastic member 16 includes, at its center, a bearing receiving hole 16a to engagingly receive the second bearing 18, and also includes two rotation preventing bosses 16b arranged along the major axis of the oval shape so as to sandwich the bearing receiving hole 16a On the other hand, as shown in FIG. 4, the rear plate 39 includes two rotation preventing means 39a (these means are constituted by holes in the embodiment but may alternatively be constituted by recesses that do not penetrate through the rear plate 39) which are mated with the rotation preventing bosses 16b of the second elastic member 16, whereby the body of the stepping motor 2 is further securely prevented from shifting relative to the case 3 in the direction of motor rotation While two of the rotation preventing bosses 16b and two of the rotation preventing means (holes) 39a are arranged in the embodiment, the present invention is not limited to this arrangement and may be duly practiced by arranging at least one thereof.

In the embodiment, the lead wire terminals 14 are inserted in terminal insertion holes 13a arranged at one end of the FPC 13 for electrical connection, and the other end of the FPC 13 is electrically connected to the PCB 12 arranged at the case 3 to thereby electrically communicate further with the external connection terminals 6 arranged at the PCB 12 (refer to FIG. 3).

Thus, since the FPC 13 is disposed between the stepping motor 2 and the PCB 12 arranged at the case 3 thereby preventing that the stepping motor 2 is directly and firmly connected to the PCB 12 fixedly attached to the case 3, the vibration and noise of the stepping motor 2 are absorbed by the FPC 13 which is flexible and elastic, and therefore are not transmitted directly to the case 3. That is to say, this structure contributes to reducing the transmission of the vibration and noise of the stepping motor 2 from the lead wire terminals 14 to the case 3.

If the lead wire terminals 14 are electrically connected directly to the PCB 12, then the vibration and noise of the stepping motor 2 are allowed to be readily transmitted from the lead wire terminals 14 to the PCB 12 and then further to the case 3 to which the PCB 12 is fixedly attached.

On the other hand, when the lead wire terminals 14 are electrically connected via the FPC 13 to the PCB 12, it becomes difficult for the vibration and noise of the stepping motor 2 to be transmitted to the PCB 12, which eventually contributes to reducing the transmission of the vibration and noise to the case 3 to which the PCB 12 is fixedly attached.

Thus, since the first elastic member 15 and the second elastic member 16 are provided between the stepping motor 2 and the case, the transmission of the vibration and noise of the stepping motor 2 to the case 3 are reduced, and also since the lead wire terminals 14 are electrically connected via the FPC 13 to the PCB 12, the transmission of the vibration and noise of the stepping motor 2 to the case 3 are further reduced.

The present invention has been described with respect to the specific embodiment. However, it is to be understood that the present invention is not limited to the embodiment described above but encompasses various modifications which fall within the spirit and scope of the present invention and which will occur to a person skilled in the art, wherein the advantages of the present invention also is not limited to those which are mentioned in the above description. That is to say, the present invention can be practiced with various additions, alterations and partial omissions without departing from the spirit and scope of the present invention which can be derived from what is disclosed in the appended claims as well as from its equivalents.

What is claimed is:

1. An actuator comprising:
   a motor comprising:
      a stator assembly;
      a rotor rotatably disposed within the stator assembly, and including an output shaft, and a first gear attached on the output shaft;
      a first bearing arranged at a frame attached on one side of the stator assembly so as to rotatably support the output shaft; and
      a second bearing arranged at a rear plate attached on other side of the stator assembly so as to rotatably support the output shaft;
   a case which houses the motor, and which comprises a first engagement recess and a second engagement recess;
   a gear train disposed in the case, and constituted of a plurality of gears for transmitting rotational motion of the motor;
   a first elastic member fitted to the first bearing, and engaged with the first engagement recess of the case; and
   a second elastic member which is disposed between the case and the rear plate of the motor, is fitted to the second bearing, and engaged with the second engagement recess of the case,
   wherein the second elastic member is engaged with the rear plate of the motor by an engaging portion, and
   wherein the engaging portion is constituted by at least one boss provided to the second elastic member and at least one hole provided to the rear plate of the motor.

2. An actuator according to claim 1, wherein the second elastic member has an oval shape adapted to engage with the second engagement recess of the case.

3. An actuator according to claim 1, wherein external connection terminals of the actuator are connected to lead wire terminals of the motor via a flexible printed circuit board.

4. An actuator, comprising:
   a motor comprising:
      a stator assembly;
      a rotor rotatably disposed within the stator assembly, and including an output shaft, and a first gear attached on the output shaft;

a first bearing arranged at a frame attached on one side of the stator assembly so as to rotatably support the output shaft; and a second bearing arranged at a rear plate attached on other side of the stator assembly so as to rotatably support the output shaft;

a case which houses the motor, and which comprises a first engagement recess and a second engagement recess;

a gear train disposed in the case, and constituted of a plurality of gears for transmitting rotational motion of the motor;

a first elastic member fitted to the first bearing, and engaged with the first engagement recess of the case; and a second elastic member which is disposed between the case and the rear plate of the motor, is fitted to the second bearing, and engaged with the second engagement recess of the case, wherein the second elastic member is engaged with the rear plate of the motor by an engaging portion, wherein the engaging portion is constituted by at least one boss provided to the second elastic member and at least one recess provided to the rear plate of the motor, and wherein the at least one boss of the engaging portion is engaged with the at least one recess of the engaging portion.

5. An actuator according to claim 1, wherein the engaging portion is constituted by two said bosses adapted to the second elastic member and two said holes adapted to the rear plate of the motor, and wherein the second elastic member includes a hole fitted to the second bearing and said two bosses of the engaging portion which are disposed outside the hole so as to engage respectively with said two recesses adapted to the rear plate of the motor.

6. An actuator according to claim 1, wherein the first and second bearings directly contact the output shaft and the first and second elastic members directly contact the first and second bearings, respectively.

7. An actuator according to claim 1, wherein said at least one boss projects from the second elastic member and said at least one hole is formed in the rear plate of the motor.

\* \* \* \* \*